United States Patent [19]

Tyler

[11] Patent Number: 6,131,183
[45] Date of Patent: Oct. 10, 2000

[54] COMPUTER AND METHOD FOR ENABLING GRAPHIC USER INTERFACE (GUI) CONTROL AND COMMAND LINE (TTY) CONTROL OF A COMPUTER PROGRAM

[75] Inventor: Ross E. Tyler, San Dimas, Calif.

[73] Assignee: Raytheon Company, Lexington, Mass.

[21] Appl. No.: 08/069,052

[22] Filed: May 24, 1993

[51] Int. Cl.[7] .............................. G06F 13/10; G06F 3/14
[52] U.S. Cl. ............................ 717/1; 709/107; 709/102; 345/26
[58] Field of Search ................................ 395/650, 700; 709/301, 107, 102; 345/26, 331

[56] References Cited

U.S. PATENT DOCUMENTS

| | | | |
|---|---|---|---|
| 4,873,652 | 10/1989 | Pilat et al. | 364/518 |
| 4,899,136 | 2/1990 | Beard et al. | |
| 5,214,757 | 5/1993 | Mauney et al. | 395/161 |
| 5,375,199 | 12/1994 | Harrow et al. | 395/159 |

OTHER PUBLICATIONS

IBM Technical Disclosure Bulletin, vol. 33, No. 3A, pp. 1–2, Oct. 190, New York, "Emulation of Personal Computer Display on AIX Virtual Terminals".
IBM Technical Disclosure Bulletin, vol. 35, No. 5, pp. 82–83, Oct. 1992, New York, "Windowing a set of 3270 Multiple Logical Terminal Sessions".
"A Bi–level object–oriented data model for GIS applications" by Amelia Choi et al, Computer Software and Applications Conference 1991) COMPSAC, IEEE.
"Extending a DBMS for Geographic Applications" by Beng Chin Ooi et al, Data Engineering, 1989 5th International Conference, IEEE.
"Tactical mapping in combat aircraft" by Ulrich Buening, National Aerospace and Electronics, 1988 Conference (NAECON), IEEE.
"Multiple Expert Systems for Using Digital Terrain Models" by David G. Goodenough et al, Remote Sensing Science for the Nineties, 1990 (IGARSS), IEEE.
"Distool–Integrating GIS, Relational database Technologies and Image Processing In a Networked Computer Environment" by H. De Groof et al, Remote Sensing Science for hte Nineties, 1990 (IGARSS), IEEE.

Primary Examiner—Tariq R. Hafiz
Assistant Examiner—Tuan Q. Dam
Attorney, Agent, or Firm—Koppel & Jacobs

[57] ABSTRACT

The ARC/INFO® geographic information system (GIS) computer program (28) supports multiple threads of command line (TTY) and graphic user interface (GUI) operations. A TTY operation at the top of a thread enables the program (28) to be controlled from a keyboard (20) through a terminal emulator (26), whereas a GUI operation at the top of a thread enables the program 28 to be controlled by a mouse (22) using a window display (24). Switching from TTY to GUI control of the program (28) in its stand-alone form requires a command from its input stream, whereas switching from GUI to TTY control requires a manual trigger from a mouse (22) or keyboard (20). A controller (44) of the invention normally enables GUI control by inserting a dummy GUI operation (50) including a dummy window as an artifact on top of a TTY operation (46) in a thread (48). In response to a TTY command from the keyboard (20) or a user program, the controller (44) deletes the dummy window, causing the dummy GUI operation (50) to be deleted from the thread (48) and enabling TTY control from the keyboard (20). The controller (44) then feeds the command to the program (28), and inserts the dummy GUI operation (50) back on top of the TTY operation (46) in the thread (48) to enable subsequent GUI control.

9 Claims, 6 Drawing Sheets

COMPUTER AND METHOD FOR ENABLING GRAPHIC USER INTERFACE (GUI) CONTROL AND COMMAND LINE (TTY) CONTROL OF A COMPUTER PROGRAM

BACKGROUND OF THE INVENTION

1. Field of the Invention

The present invention generally relates to the art of computers, and more specifically to a controller for the ARC/INFO® geographic information system (GIS) and similar computer software programs which enables command line (TTY) control using a keyboard and graphic user interface (GUI) control using a mouse or keyboard without manual switching by the user.

2. Description of the Related Art

ARC/INFO® is a mapping and geographic information system (GIS) computer software program which is commercially available from Environmental Systems Research Institute (ESRI), Inc. of Redlands, Calif. ARC/INFO is used to compose and present maps overlaid with geographic and other information in the forms of alphanumeric characters and icons. A comprehensive introduction to ARC/INFO is presented in a promotional brochure entitled "ARC/INFO®: GIS Today and Tomorrow", ESRI WHITE PAPER SERIES, Environmental Research Institute, Inc., September 1992.

ARC/INFO is provided with a graphic user interface (GUI) and a toolkit which enables custom windows and menus to be created by the user for semi-automated execution of specific applications using a mouse or other pointing device, or a keyboard.

The general configuration of ARC/INFO® in its stand-alone form as installed for use in a general purpose computer is illustrated in FIG. 1. A computer system 10 includes a computer 12 which preferably runs under the UNIX® operating system in a standard X-windows environment, although the invention is not so limited. The computer 12 includes a keyboard 20, mouse 22 and video display monitor 24.

The computer system 10 further includes a program software system 16, which includes a conventional X-server 18 for controlling input, output and display operations for the keyboard 20, mouse 22 and monitor 24.

The software system 16 further includes a terminal emulator 26 for processing command line (TTY) inputs from the keyboard 20 under control of the X-server 18 and feeding them to the ARC/INFO system program which is designated as 28. The X-server 18 directs graphic control (GUI) inputs from the mouse 22 and keyboard 20 to the program 28, and feeds display outputs from the program 28 to the monitor 24.

Although the system 10 including ARC/INFO in its stand-alone form enables both TTY control using the keyboard 20 and GUI control using the mouse 22, it must be manually switched back and forth between these two modes of control. Switching from TTY to GUI control requires manually issuing a command from the keyboard 20, whereas switching from GUI to TTY control requires manually clicking on a display icon using the mouse 22 or a pressing a key on the keyboard 20.

This is major problem in an application in which a user program periodically generates data for display by the system 28 on the monitor 24. Although the user program can automatically apply the data to the TTY control input, it is necessary for the user to manually switch from GUI to TTY control to enable the program to update the display.

Especially in an application in which the user must make rapid decisions based on the information displayed by the system 10, requiring the user to manually perform such a low level task as manually updating the monitor display is unacceptable.

The reason that the ARC/INFO program 28 in its stand-alone form requires manual switching between TTY and GUI control is illustrated in FIGS. 2a to 2c. The ARC/INFO program 28 supports multiple threads of control operations, as indicated at 30, 32 and 34. Each thread 30, 32 and 34 can have a stack of suspended operations (TTY interpreters, GUI windows or menus) in it. ARC/INFO threads are similar to UNIX processes in that the UNIX operating system schedules processes while ARC/INFO schedules threads.

Each thread 30, 32 and 34 can also include ARC/INFO macro language (AML) operations. The AML operations launch specific tasks or functions in the system 28 which can be customized using the ARC/INFO toolkit.

In FIG. 2a, the threads 30, 32 and 34 all have GUI operations at their tops which do not have any precedence over each other, and are assigned a priority of "0". The order in which these operations are scheduled is determined by the scheduler in the ARC/INFO program 28 and input received from the mouse 22 and keyboard 20.

FIG. 2b illustrates an AML operation at the top of the thread 30, and GUI operations at the tops of the threads 32 and 34. An AML operation takes precedence over a GUI operation and is assigned a priority of "1". The AML operation in the thread 30 will therefore be scheduled ahead of the GUI operations in the threads 32 and 34. The GUI operations will not be scheduled until all threads are in the context of a GUI operation.

FIG. 2c illustrates an AML operation at the top of the thread 30, a TTY operation at the top of the thread 32 and a GUI operation at the top of the thread 34. A TTY operation takes precedence over both AML and GUI operations, and is assigned a priority of "2". The TTY operation in the thread 32 will therefore be scheduled ahead of the AML operation in the thread 30, which in turn is ahead of the GUI operation in the thread 34.

If a TTY operation is at the top of a thread, it will be scheduled and will not relinquish control to any other thread until it returns (is popped off the thread and returns to the operation that called it), or suspends itself by pushing a GUI operation on top of itself on its own thread. Thus, while a TTY operation is at the top of a thread, no GUI or AML operations on the tops of any other threads will be scheduled.

If the ARC/INFO system 28 is under control of a GUI operation at the top of a thread, switching to TTY control must be triggered by a manual input that causes a TTY operation to become the current operation at the top of some thread.

SUMMARY OF THE INVENTION

The ARC/INFO® geographic information system (GIS) and similar computer programs support multiple threads of command line (TTY) and graphic user interface (GUI) operations. A TTY operation at the top of a thread enables ARC/INFO to be controlled with an input stream of commands from a keyboard or user program, whereas a GUI operation at the top of a thread enables ARC/INFO to be controlled by a mouse or keyboard using a window display.

Switching from TTY to GUI control of ARC/INFO in its stand-alone form requires a command from its input stream, whereas switching from GUI to TTY control requires a manual trigger from the mouse or keyboard.

An ARC/INFO controller embodying the present invention allows power users to converse with ARC/INFO in its native language via the TTY interface without sacrificing the availability of the friendlier GUI interface. The controller also allows procedural (computer driven) interaction with the ARC/INFO program from a separate user program. The ARC/INFO program thereby appears responsive to both TTY and GUI inputs simultaneously.

The present controller normally enables GUI control. This is done by pushing a dummy GUI operation (which has a dummy window as an artifact) on top of the TTY operation listening to the controller.

In response to a TTY command from the keyboard or a user program, the controller deletes the dummy window, causing the GUI operation to return control to the calling TTY operation (waking it up), feeds the command to ARC/INFO and pushes the dummy GUI operation back on the thread to enable subsequent GUI control.

ARC/INFO is switched automatically from GUI control to TTY control in response to a TTY command, eliminating the necessity of manual switching in the stand-alone version of ARC/INFO. This is especially advantageous in that the display can be automatically updated by TTY commands from a user program, relieving the user from the unacceptable requirement of manually updating the display.

Although specifically designed for the ARC/INFO® system, the present invention is also applicable for enabling both TTY and GUI control of other program systems which support multiple threads of operations and in which a TTY operation on top of a thread takes precedence over GUI operations on the tops of other threads.

These and other features and advantages of the present invention will be apparent to those skilled in the art from the following detailed description, taken together with the accompanying drawings, in which like reference numerals refer to like parts.

DETAILED DESCRIPTION OF THE INVENTION

Figure 1:
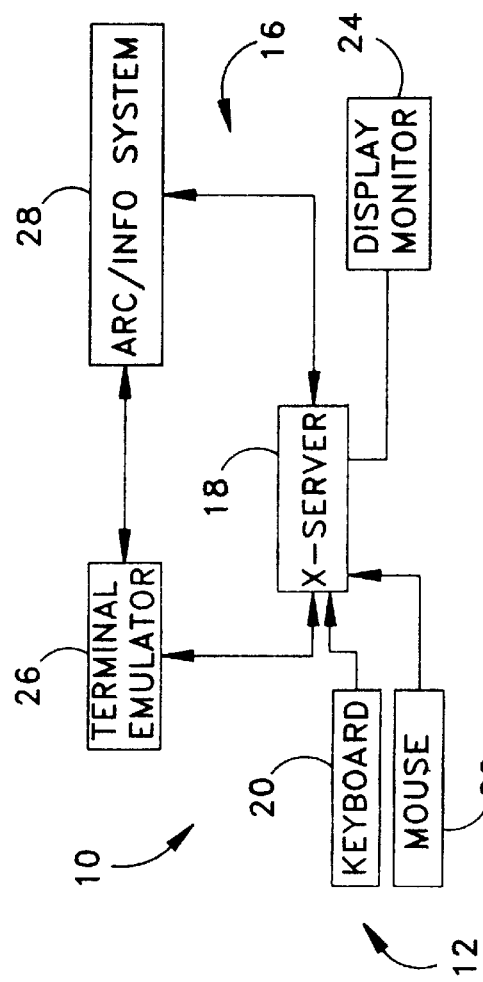
FIG. 1 is a block diagram of a computer system incorporating the ARC/INFO® computer software program in its stand-alone form.
Figure 3:
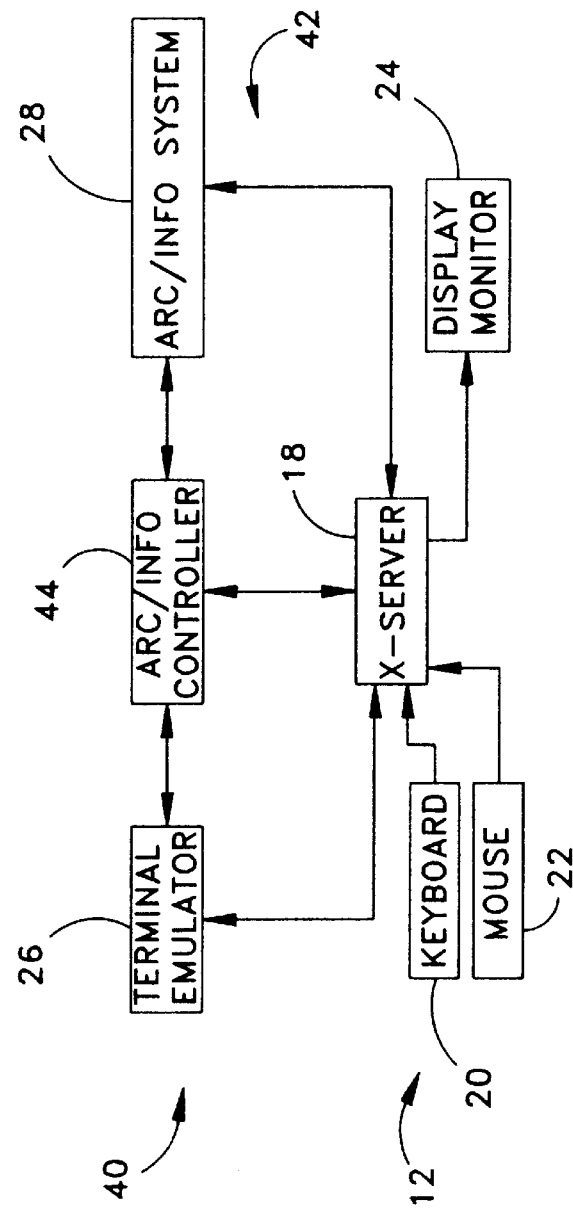
FIG. 3 is a block diagram of a computer system incorporating the ARC/INFO computer software program and an ARC/INFO controller embodying the present invention.
Figure 2A:
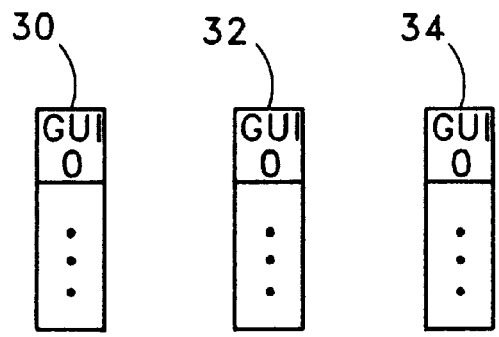
FIGS. 2a to 2c are diagrams illustrating the operation scheduling environment in the ARC/INFO program.
Figure 2B:
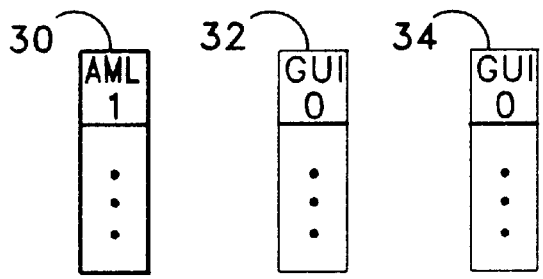
Figure 2C:
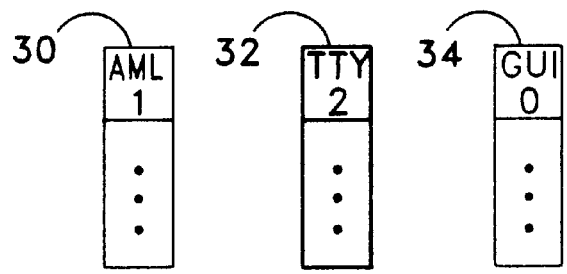

FIG. 3 illustrates a computer system 40 embodying the present invention, including elements which are common to the prior art system 10 and are designated by the same reference numerals. The computer system 40 differs from the computer system 10 in that a program software system 42 includes an ARC/INFO controller (AIC) 44 which is connected between the terminal emulator 26 and the ARC/INFO system 28. The controller 44 also communicates with the X-server 18.

Figures 4A, 4B, 4C:
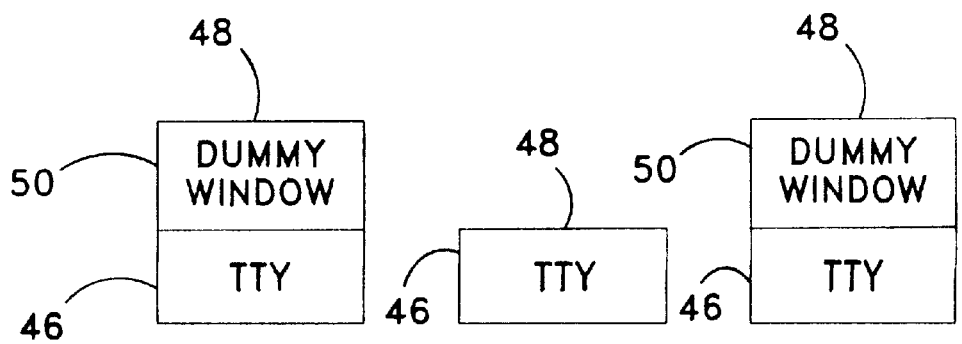
FIGS. 4a to 4c are diagrams illustrating the basic operating principles of the present controller.

The basic operating principle of the invention is illustrated in FIGS. 4a to 4c. The ARC/INFO program 28 creates a TTY operation 46 connected to the program's standard input and standard output as the single operation in the initial thread 48. The controller 44 then pushes a dummy GUI operation 50 on top of the TTY operation 46 in the thread 48. An artifact of the dummy GUI operation 50 is a dummy menu or window. The content of the dummy window is not important since it will not be accessed.

The TTY operation 46 is not considered by the scheduler since the dummy GUI operation 50 has suspended it. This enables the ARC/INFO system 28 to be normally controlled by GUI operations on the tops of any other threads.

In response to a TTY command from the keyboard 20 through the terminal emulator 26, or from an auxiliary user program, the controller 44 deletes the dummy window and thereby pops the dummy GUI operation 50, returning control to the TTY operation 46 as illustrated in FIG. 4b. Since the operation 46 is at the top of the thread 48, it will take precedence over and be scheduled by the ARC/INFO system 28 ahead of GUI and AML operations on the tops of any other threads. This enables a TTY command from the terminal emulator 26 or user program to be fed or relayed to the system 28.

As illustrated in FIG. 4c, after the TTY command has been successfully fed from the terminal emulator 26 or user program to the ARC/INFO system 28, the controller 44 pushes the GUI operation 50 back on top of the TTY operation 46 in the thread 48 to cause the dummy window to be recreated and to restore control to the GUI operations in the other threads.

It will be noted that an auxiliary user program or process can cause a TTY command to be applied to the system 28 in response to any event which can be detected by the user program.

Figure 5:
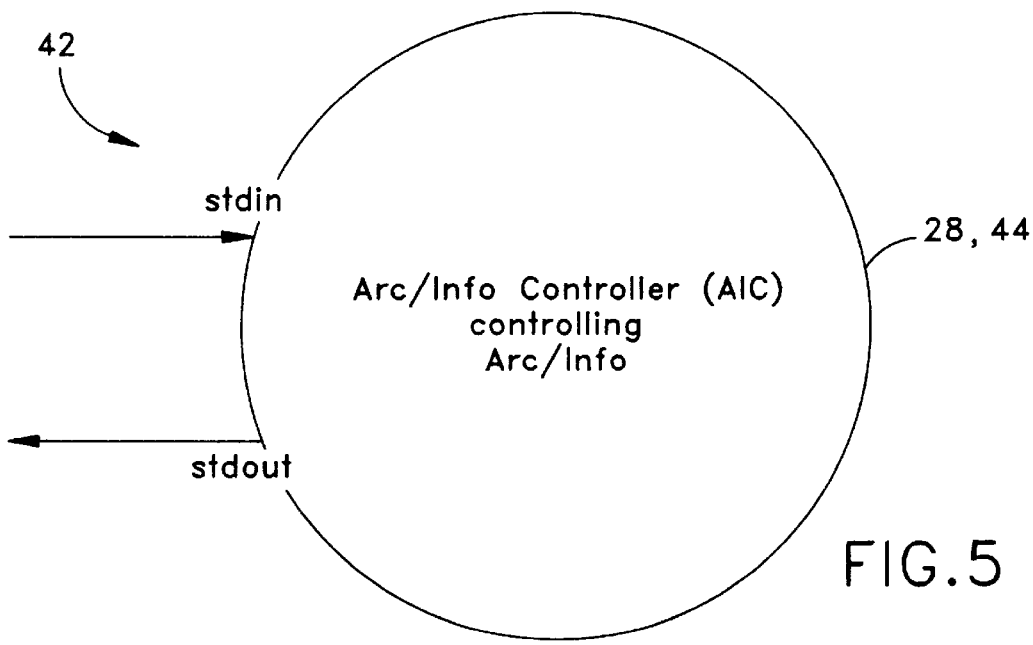
FIG. 5 is a system context data flow diagram illustrating part of the software system of FIG. 3.

A system context data flow diagram of part of the system 42 which includes the ARC/INFO program 28 and the ARC/INFO controller 44 is illustrated in FIG. 5. The system 42 is provided with two TTY data streams; a standard input "stdin" and a standard output "stdout". With the Unix operating system it is simple to redirect stdin and stdout to the terminal emulator 26 or to a file or user program.

The system 42 is most easily verified when stdin and stdout are connected to a terminal or a terminal emulator. Typing in ARC/INFO commands at the terminal and verifying the results on the terminal and ARC/INFO display is done in the same manner as using ARC/INFO directly.

The system 42 is most useful when stdin is connected to stdout of another process. This is easy to do using standard UNIX shells. The other process can use any UNIX event to trigger output and thereby trigger the ARC/INFO program 28.

Figure 6:
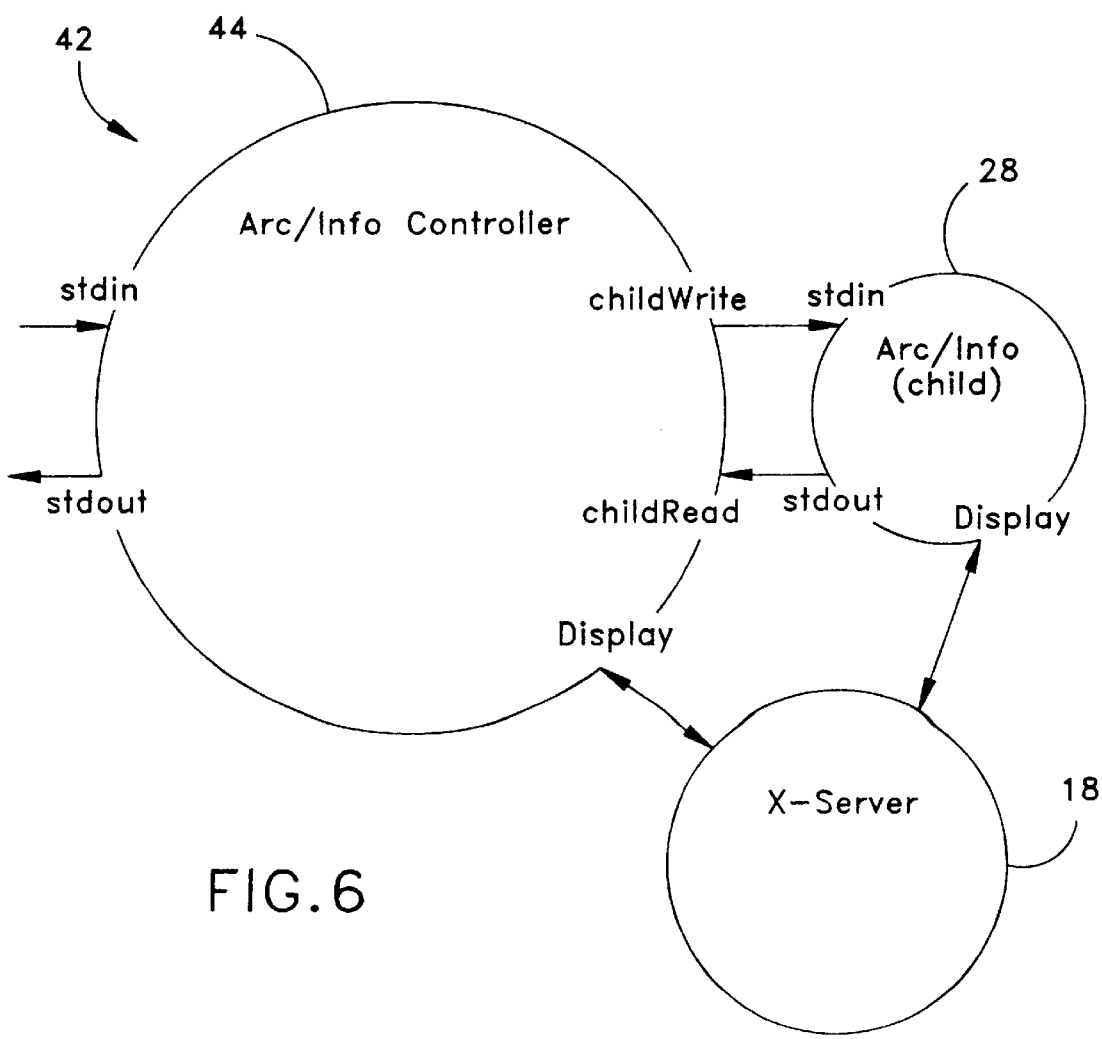
FIG. 6 is a data flow diagram illustrating the present controller.

A data flow diagram of the ARC/INFO controller 44 is illustrated in FIG. 6. The controller 44 spawns the ARC/

INFO program 28 as a child process and glues its stdin and stdout to "childWrite" and "childRead" respectively which can be a pty/tty pair or a set of pipes.

In addition to scheduling the ARC/INFO system 28, the controller 44 simply passes its stdin through its childWrite to the stdin of the ARC/INFO program 28. It also takes the stdout of the ARC/INFO program 28 through its childRead and passes it along to its stdout. Both the ARC/INFO program 28 and the ARC/INFO controller 44 create independent "Display" connections to the X-server 18.

Figure 7:
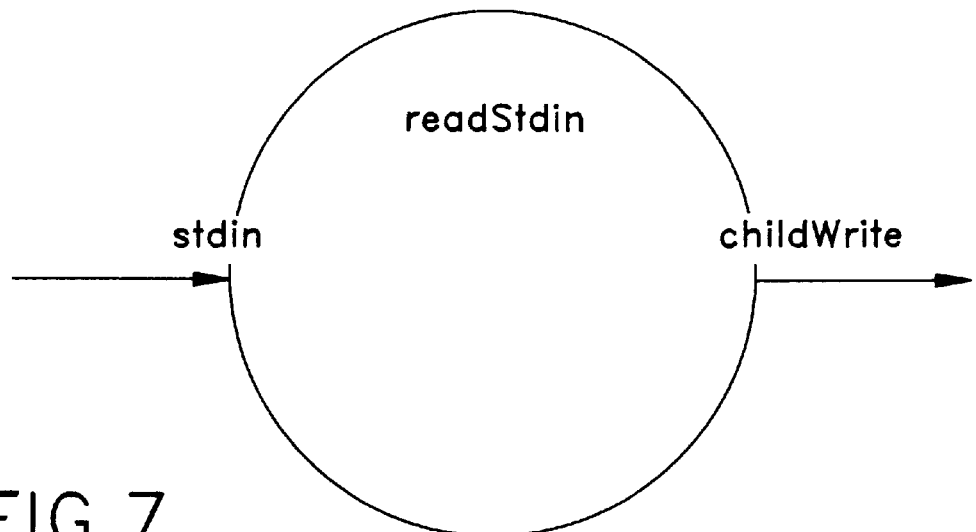
FIG. 7 is a data flow diagram illustrating data transformation as performed by the controller.

The ARC/INFO controller 44 performs the readStdin transform when there is data available on its stdin stream. This transform is done in three steps as illustrated in FIG. 7.

1. Wake up the ARC/INFO child (get the attention of the ARC/INFO program 28 directed to its stdin). This must be done before relaying the stdin stream to childWrite. The method of getting the ARC/INFO program 28 to wake up is by sending a "Delete Window" message to the X-server 18 using the standard X window manager protocols. The window that the "Delete Window" message is directed to is the artifact window of the dummy GUI operation 50 which is blocking the underlying TTY operation 46. Deleting the window causes the GUI operation 50 to complete and return control to the TTY operation 46 which will read ARC/INFO's stdin.

2. Relay stdin to childWrite. The TTY operation 46 of the ARC/INFO program 28 will interpret all commands relayed.

3. Put the ARC/INFO child to sleep (direct the attention of the ARC/INFO program 28 away from its stdin). This is accomplished by sending the program 28 a command for interpretation which will push the dummy GUI operation 50 on top of the TTY operation 46 in the thread 48 such that the operation 50 will not complete until its associated artifact window is deleted.

After performing the above three steps, the system 42 is in its normal state in which it is controlled by GUI operations in threads other than the thread 48. If another readStdin event is detected, the above three steps will be repeated to enable the ARC/INFO program 28 to receive and interpret the incoming TTY command.

Figure 8:
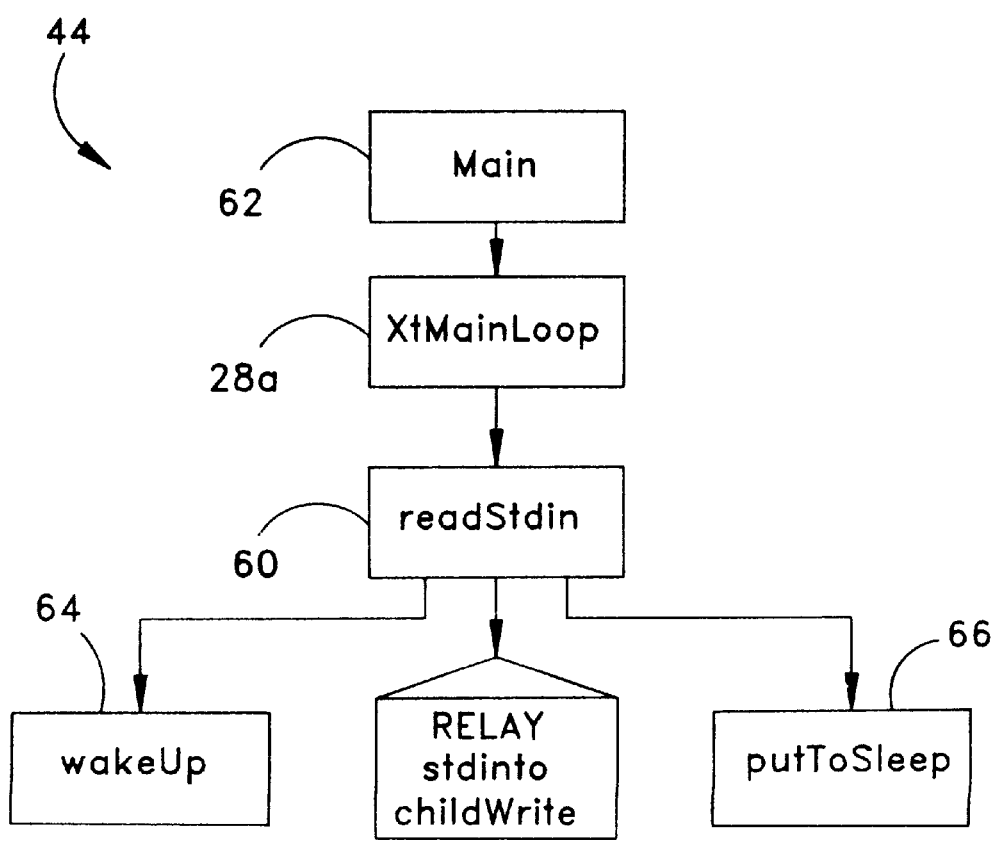
FIG. 8 is a structure chart illustrating the controller and a relevant section of the ARC/INFO program.

A structure chart of the ARC/INFO controller 44 is illustrated in FIG. 8, in combination with an XtMainLoop routine 28*a* which is the main routine of the ARC/INFO program 28. The controller 44 includes a readStdin subroutine 60 which is called by XtMainLoop 28*a* in accordance with callback parameters set up by a main routine 62. The readStdin subroutine 60 calls a wakeup subroutine 64 and a putToSleep subroutine 66.

Figure 9:
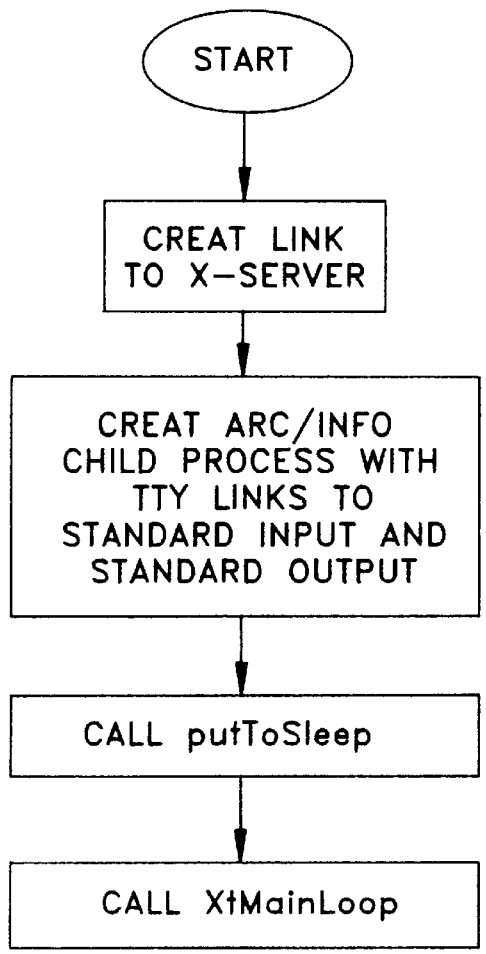
FIG. 9 is a flowchart illustrating a MAIN routine of the controller.

The construction and operation of the ARC/INFO controller 44 will be described with reference to the flowcharts of FIGS. 9 to 12. As illustrated in FIG. 9, the main routine 60 sets up system operation by creating a communication link to the X-server 18 and creating the ARC/INFO child process with TTY links to its stdin and stdout. The readStdin subroutine 60 is registered so that it will be called back from within XtMainLoop 28*a* upon the event that there is something to read from the stdin of the ARC/INFO controller 44.

The MAIN routine 60 then calls the putToSleep subroutine 66 which inserts the dummy GUI operation 50 on top of the TTY operation 46 in the thread 48. This causes the system 42 to be controlled by GUI commands at the tops of other threads.

Figure 10:
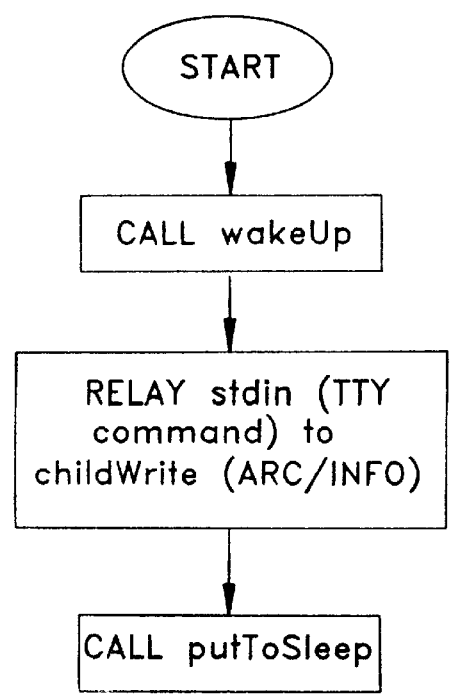
FIG. 10 is a flowchart illustrating a READ STANDARD INPUT subroutine of the controller.

In response to a TTY command from the terminal emulator 26 or from an auxiliary user program (such as to update the display on the monitor 24 with new data), the associated event is detected by XtMainLoop 28*a* which calls the readStdin subroutine 60. As illustrated in FIG. 10, the readStdin subroutine 60 calls the wakeup subroutine 64 which sends a command to the X-server 18 to delete the dummy window associated with the dummy GUI operation 50.

Control is then returned to the TTY command 46 which is scheduled on a priority basis to cause the ARC/INFO program 28 to direct attention to its stdin and stdout.

The readStdin subroutine 60 then causes the TTY command to be relayed from the terminal emulator 26 or user program through childWrite to the stdin of the ARC/INFO program 28. Upon completion of this operation, the readStdin subroutine 60 calls the putToSleep subroutine 66 to push the dummy GUI operation 50 back on top of the TTY operation 46 in the thread 48. This causes subsequent control to return to the GUI operations at the tops of the other threads. The readStdin subroutine 66 then returns to XtMainLoop 28*a*.

Figure 11:
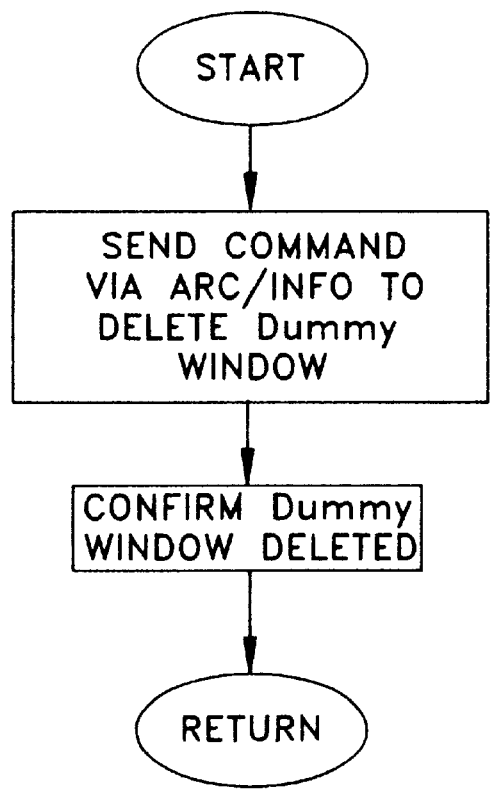
FIG. 11 is a flowchart illustrating a WAKE-UP subroutine of the controller.

The wakeup subroutine 64 is illustrated in FIG. 11. The subroutine 64 sends a command to the ARC/INFO program 28, which in turn sends a command to the X-server 18 to delete the dummy window. The subroutine 64 then repeatedly polls the X-server 18 to determine if the dummy window is still present. When the information returned to the subroutine 64 from the X-server 18 indicates that the dummy window is no longer present, the subroutine 64 returns to the readStdin subroutine 60.

Figure 12:
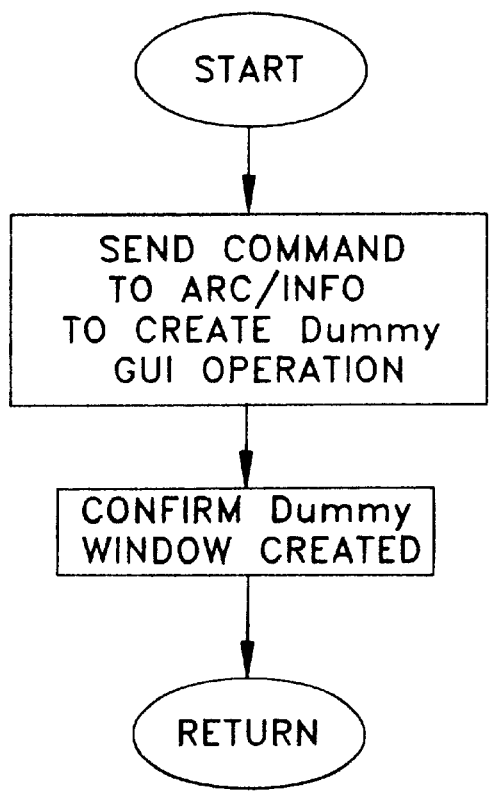
FIG. 12 is a flowchart illustrating a PUT TO SLEEP subroutine of the controller.

The putToSleep subroutine 66 is illustrated in FIG. 12. The subroutine 66 sends a command to the ARC/INFO program 28 to push the dummy GUI operation 50 on top of the TTY operation 46 in the thread 48. The subroutine 66 then repeatedly polls the X-server 18 to determine if the associated dummy window is present. When the information returned to the subroutine 66 from the X-server 18 indicates that the dummy window is present, the subroutine 66 returns to the readStdin subroutine 60.

While an illustrative embodiment of the invention has been shown and described, numerous variations and alternate embodiments will occur to those skilled in the art, without departing from the spirit and scope of the invention. Accordingly, it is intended that the present invention not be limited solely to the specifically described illustrative embodiment. Various modifications are contemplated and can be made without departing from the spirit and scope of the invention as defined by the appended claims.

I claim:

1. A method for enabling command line (TTY) and graphic user interface (GUI) control of a main program in a computer which schedules multiple threads of operations and in which a TTY operation at the top of a first thread supersedes GUI operations at the top of a second thread, said main program inserting a TTY control operation at the top of said first thread, comprising the steps of:

(a) inserting a dummy GUI operation on top of said TTY control operation in said first thread that suspends said TTY control operation and causes said main program to be controlled by said GUI operation on top of said second thread;

(b) displaying a dummy window as an artifact of said dummy GUI operation; and (c) in response to a TTY control command, removing said dummy GUI operation from said first thread and deleting said dummy window to cause said main program to be controlled by said TTY control operation and thereby avoid the need for a user to manually dismiss the dummy window, feeding said TTY control command to said main program, scheduling said first thread, and inserting said dummy GUI operation on top of said TTY control operation in said first thread to cause said main program to be subsequently controlled by said GUI control operation in said second thread.

2. A method as in claim 1, in which step (b) comprises removing said dummy GUI operation from said first thread by sending a command to a display controller to delete said dummy window.

3. A method as in claim 1, in which step (b) comprises inserting said dummy GUI operation on top of said TTY control operation in said first thread by sending a command to said program to create said dummy GUI operation.

4. A computer system for enabling command line (TTY) and graphic user interface (GUI) control of a main program to update a graphic display without requiring a user to manually switch from GUI control to TTY control, comprising:

an external source that generates TTY inputs and a TTY control command;

a user controlled input device for generating GUI inputs;

a display that generates said graphic display from said TTY and GUI inputs; and a computer programmed with the main program which has an input and a GUI, said main program responding to TTY and GUI inputs by scheduling multiple threads of operations to update said graphic display, the order in which the threads are scheduled being determined by the precedence of the operation at the top of each thread, a TTY operation at the top of a first thread which is connected to said input taking precedence over a GUI operation at the top of a second thread, said computer being configured to insert a dummy GUI operation on top of said TTY operation to display a dummy window on said display and suspend said TTY operation so that said main program schedules said second thread ahead of said first thread thereby updating said graphic display in accordance with the GUI inputs, and being configured to respond to said TTY control command by removing said dummy GUI operation and deleting said dummy window so that said main program schedules said first thread ahead of said second thread thereby updating said graphic display in accordance with the TTY inputs, and thereafter to insert said dummy GUI operation back on top of said TTY operation.

5. A computer as in claim 4, wherein said external source is an auxiliary program.

6. A computer as in claim 4, wherein said external source comprises:

a keyboard for generating said TTY inputs; and a terminal emulator for generating said TTY control command.

7. A computer as in claim 4, wherein said main program is Arc/Info®.

8. A method for enabling a computer to respond to command line (TTY) inputs and graphic user interface (GUI) inputs, comprising:

(a) providing said computer with a main program that has an input and a GUI, and which responds to TTY inputs received at its input and GUI inputs by scheduling multiple threads of operations, the order in which the operations are scheduled being determined by the precedence of the operation at the top of each thread, with a TTY operation at the top of a first thread which is connected to the input taking precedence over a GUI operation at the top of a second thread;

(b) inserting a dummy GUI operation on top of said TTY operation to suspend said TTY operation so that said main program schedules said second thread ahead of said first thread;

(c) displaying a dummy window as an artifact of said dummy GUI operation;

(d) in response to receiving TTY inputs at said standard input, removing said dummy GUI operation and deleting the dummy window so that said main program schedules said first thread ahead of said second thread; and (e) inserting said dummy GUI operation back on top of said TTY control operation in said first thread.

9. A computer as in claim 8, wherein said main program is Arc/Info®.

* * * * *